(12) United States Patent
Han et al.

(10) Patent No.: US 12,606,026 B2
(45) Date of Patent: Apr. 21, 2026

(54) FAILURE DETECTION METHOD OF CURRENT SENSOR IN CONVERTER, VEHICLE SYSTEM AND ELECTRIC CONTROL UNIT

(71) Applicant: HL MANDO CORPORATION, Pyeongtaek (KR)

(72) Inventors: Hyeonghyeon Han, Incheon (KR); Suwan Woo, Gunpo (KR)

(73) Assignee: HL MANDO CORPORATION, Pyeongtaek (KR)

( * ) Notice: Subject to any disclaimer, the term of this patent is extended or adjusted under 35 U.S.C. 154(b) by 321 days.

(21) Appl. No.: 18/314,924

(22) Filed: May 10, 2023

(65) Prior Publication Data
US 2024/0262209 A1 Aug. 8, 2024

(30) Foreign Application Priority Data
Feb. 7, 2023 (KR) ......................... 10-2023-0015989

(51) Int. Cl.
*B60L 3/00* (2019.01)
*B60L 53/22* (2019.01)

(52) U.S. Cl.
CPC .............. *B60L 3/0038* (2013.01); *B60L 53/22* (2019.02); *B60L 2210/10* (2013.01); *B60L 2240/549* (2013.01)

(58) Field of Classification Search
CPC .... B60L 3/0038; B60L 53/22; B60L 2210/10; B60L 2240/549; G01R 35/00; G01R 19/0092; G01R 19/12; G01R 19/16528; G01R 31/006; G01R 31/385; G01R 31/40; H02M 3/00
See application file for complete search history.

(56) References Cited

U.S. PATENT DOCUMENTS

| | | | | |
|---|---|---|---|---|
| 2003/0071587 A1* | 4/2003 | Suzuki | ................... | B62D 5/046 |
| | | | | 318/139 |
| 2016/0079751 A1* | 3/2016 | Ide | ........................... | B60L 3/003 |
| | | | | 307/52 |

(Continued)

FOREIGN PATENT DOCUMENTS

| | | |
|---|---|---|
| KR | 10-2016-0035743 A | 4/2016 |
| KR | 10-2019-0092089 A | 8/2019 |

(Continued)

OTHER PUBLICATIONS

The Office Action dated Mar. 17, 2025.

*Primary Examiner* — Giovanni Astacio-Oquendo
*Assistant Examiner* — Haidong Zhang
(74) *Attorney, Agent, or Firm* — Harvest IP Law, LLP

(57) ABSTRACT

The present disclosure relates to a failure detection method for detecting a failure of a current sensor in a converter. A failure detection method of a current sensor in a converter includes recognizing a voltage value of a high voltage battery associated with a vehicle, calculating a reference current value of the converter associated with the high voltage battery based on the recognized voltage value of the high voltage battery and a resistance value of a pre-charge relay, obtaining a sensing current value from the current sensor in the converter, and detecting whether the current sensor in the converter fails using the calculated reference current value and a sensing current value obtained from the current sensor.

20 Claims, 7 Drawing Sheets

(56) References Cited

U.S. PATENT DOCUMENTS

| 2016/0084917 A1* | 3/2016 | Nam | ...................... H02J 7/005 |
| | | | 324/432 |
| 2017/0089955 A1* | 3/2017 | Yugou | ................... B60L 3/0038 |

FOREIGN PATENT DOCUMENTS

| KR | 10-2020-0039061 A | 4/2020 |
| KR | 10-2020-0124032 A | 11/2020 |
| KR | 10-2021-0012556 A | 2/2021 |

* cited by examiner

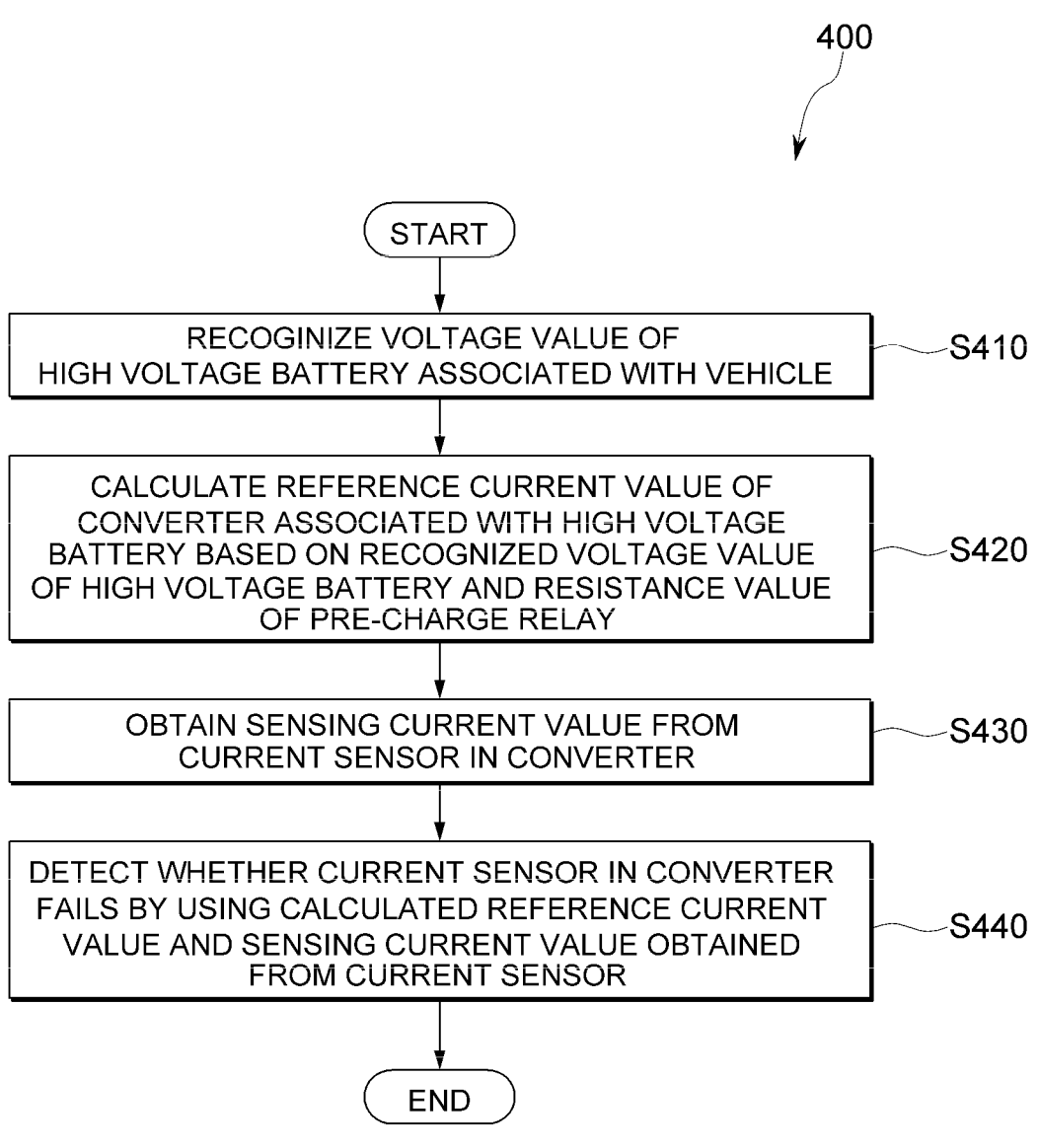

400

START

RECOGINIZE VOLTAGE VALUE OF
HIGH VOLTAGE BATTERY ASSOCIATED WITH VEHICLE — S410

CALCULATE REFERENCE CURRENT VALUE OF
CONVERTER ASSOCIATED WITH HIGH VOLTAGE
BATTERY BASED ON RECOGNIZED VOLTAGE VALUE
OF HIGH VOLTAGE BATTERY AND RESISTANCE VALUE
OF PRE-CHARGE RELAY — S420

OBTAIN SENSING CURRENT VALUE FROM
CURRENT SENSOR IN CONVERTER — S430

DETECT WHETHER CURRENT SENSOR IN CONVERTER
FAILS BY USING CALCULATED REFERENCE CURRENT
VALUE AND SENSING CURRENT VALUE OBTAINED
FROM CURRENT SENSOR — S440

END

FAILURE DETECTION METHOD OF CURRENT SENSOR IN CONVERTER, VEHICLE SYSTEM AND ELECTRIC CONTROL UNIT

CROSS-REFERENCE TO RELATED APPLICATION

This application claims priority under 35 U.S.C. § 119 to Korean Patent Application No. 10-2023-0015989, filed on Feb. 7, 2023, in the Korean Intellectual Property Office (KIPO), the disclosure of which is incorporated by reference herein in its entirety.

TECHNICAL FIELD

The present disclosure relates to a method of detecting, even with only one current sensor in a converter, a failure of the current sensor, and a vehicle system, an electronic control unit having the same.

BACKGROUND

With the recent increase in the popularity of electric vehicles, various technologies are being developed to secure stability of the electric vehicles. In general, an electric vehicle includes a driving circuit for controlling driving of the vehicle by connecting a high voltage battery and a converter through a relay. In addition, the converter of the electric vehicle includes a current sensor for sensing and utilizing current flowing through the driving circuit.

It is important to determine a failure of the current sensor included in the converter in order to secure the stability of the vehicle. Generally, to determine the failure of the current sensor, methods such as using a slope of a current sensor level and employing two current sensors are used. However, the method of using the slope of the current sensor level has a limitation in that it cannot determine a failure when the current is stuck and remains in a normal range, and the method of using two current sensors has a problem in that price competitiveness is reduced because the product price increases due to an extra current sensor.

SUMMARY

The present disclosure provides a failure detection method and system (apparatus) for detecting a failure of a current sensor in a converter for solving the above issues.

The present disclosure may be implemented in a variety of ways, including a method, a system (an apparatus), a computer program stored in a non-transitory computer-readable medium storing instructions, or a non-transitory computer-readable medium in which a computer program is stored.

In accordance with an aspect of the present disclosure, there is provided a failure detection method for detecting a failure of a current sensor in a converter performed by at least one processor including recognizing a voltage value of a high voltage battery associated with a vehicle, calculating a reference current value of the converter associated with the high voltage battery based on the recognized voltage value of the high voltage battery and a resistance value of a pre-charge relay, obtaining a sensing current value from the current sensor in the converter, and detecting whether the current sensor in the converter fails using the calculated reference current value and a sensing current value obtained from the current sensor.

According to an embodiment of the present disclosure, the calculating of the reference current value of the converter includes calculating the reference current value of the converter based on dividing the recognized voltage value of the high voltage battery by the resistance value of the pre-charge relay.

According to an embodiment of the present disclosure, the failure detection method further includes extracting a phase value of the converter. The calculating of the reference current value of the converter based on dividing the recognized voltage value of the high voltage battery by the resistance value of the pre-charge relay includes calculating a base current value by dividing the voltage value of the high voltage battery by the resistance value of the pre-charge relay, and calculating the reference current value of the converter by dividing the calculated base current value by the extracted phase value of the converter.

According to an embodiment of the present disclosure, the calculating the reference current value of the converter based on the voltage value of the high voltage battery and the resistance value of the pre-charge relay is performed when the pre-charge relay is controlled to be turned ON.

According to an embodiment of the present disclosure, the recognizing the voltage value of the high voltage battery associated with the vehicle is performed in response to starting of the vehicle being controlled to be ON.

According to an embodiment of the present disclosure, the detecting of whether the current sensor in the converter fails includes determining a reference current value range having a tolerance range based on the calculated reference current value of the converter, and detecting whether the current sensor in the converter fails based on whether the sensing current value falls within the reference current value range.

According to an embodiment of the present disclosure, the converter is a DC/DC converter including one current sensor.

In accordance with another embodiment of the present disclosure, there is provided a vehicle system including a high voltage battery for providing power to a vehicle, a converter for converting a voltage of the high voltage battery into a low voltage to provide it to an electric system associated with the vehicle, a pre-charge relay for connecting the high voltage battery and the converter and reducing a potential difference between the high voltage battery and the converter, a main relay configured to connect the high voltage battery and the converter and provide the voltage of the high voltage battery to the converter when the potential difference is reduced by the pre-charge relay, and an electronic control unit configured to detect a failure of a current sensor in the converter using the pre-charge relay.

According to an embodiment of the present disclosure, the electronic control unit is configured to recognize a voltage value of the high voltage battery associated with the vehicle, calculate a reference current value of the converter associated with the high voltage battery based on the recognized voltage value of the high voltage battery and a resistance value of the pre-charge relay, and detect whether the current sensor in the converter fails using the calculated reference current value.

According to an embodiment of the present disclosure, the electronic control unit is configured to calculate the reference current value of the converter based on dividing the recognized voltage value of the high voltage battery by the resistance value of the pre-charge relay.

According to an embodiment of the present disclosure, the electronic control unit is configured to extract a phase value of the converter, calculate a base current value by dividing the voltage value of the high voltage battery by the resistance value of the pre-charge relay, and calculate the reference current value of the converter by dividing the calculated base current value by the extracted phase value of the converter.

According to an embodiment of the present disclosure, the electronic control unit is configured to control the pre-charge relay to be turned ON in response to starting of the vehicle being controlled to be ON, and when the pre-charge relay is controlled to be turned ON, calculate the reference current value of the converter based on the voltage value of the high voltage battery and the resistance value of the pre-charge relay.

According to an embodiment of the present disclosure, the electronic control unit is configured to control the pre-charge relay to be turned OFF and control the main relay to be turned ON to connect the converter with the high voltage battery when no failure is detected in the current sensor in the converter.

According to an embodiment of the present disclosure, the electronic control unit is configured to obtain a sensing current value from the current sensor in the converter, and detect whether the current sensor in the converter fails using the calculated reference current value and the sensing current value obtained from the current sensor.

According to an embodiment of the present disclosure, the electronic control unit is configured to recognize the voltage value of the high voltage battery associated with the vehicle in response to starting of the vehicle being controlled to be ON.

According to an embodiment of the present disclosure, the electronic control unit is configured to obtain a sensing current value from the current sensor in the converter, determine a reference current value range having a tolerance range based on the calculated reference current value of the converter, and detect whether the current sensor in the converter fails based on whether the sensing current value falls within the reference current value range.

In accordance with another aspect of the present disclosure, there is provided an electronic control unit comprising a processor and a memory, the electronic control unit, by an operation of the processor, configured to recognize a voltage value of a high voltage battery associated with a vehicle, calculate a reference current value of a converter associated with the high voltage battery based on the recognized voltage value of the high voltage battery and a resistance value of a pre-charge relay, obtain a sensing current value from a current sensor in the converter, and detect whether the current sensor in the converter fails using the calculated reference current value and the sensing current value obtained from the current sensor.

According to an embodiment of the present disclosure, the electronic control unit is configured to calculate the reference current value of the converter based on dividing the recognized voltage value of the high voltage battery by the resistance value of the pre-charge relay.

According to an embodiment of the present disclosure, the electronic control unit is configured to determine a reference current value range having a tolerance range based on the calculated reference current value of the converter, and detect whether the current sensor in the converter fails based on whether the sensing current value falls within the reference current value range.

In various embodiments of the present disclosure, a vehicle system may determine whether a current sensor fails before a converter is connected to a main relay and operates, and the converter may include only one current sensor, thereby reducing the PCB area compared to the conventional converter including two current sensors and effectively securing the price competitiveness.

In various embodiments of the present disclosure, when the converter has a plurality of phases, it is possible to detect with only one current sensor for each phase the failure of the current sensor, thereby effectively reducing the PCB area and volume and securing high price competitiveness.

In various embodiments of the present disclosure, the vehicle system may effectively perform vehicle control by detecting whether the current sensor in the converter fails in advance at the time when a pre-charge relay is connected.

Effects of the present disclosure are not limited to the effects mentioned above, and other effects not mentioned will be clearly understood by a person having ordinary knowledge in the technical field to which the present disclosure pertains (referred to as "a person skilled in the art") from the description of the claims.

BRIEF DESCRIPTION OF THE DRAWINGS

Embodiments of the present disclosure will be described with reference to the accompanying drawings described below, where similar reference numerals represent similar elements, but are not limited thereto.

FIG. 4 is a diagram illustrating an example of a failure detection method of a current sensor in a converter according to an embodiment of the present disclosure.

DETAILED DESCRIPTION

Figure 1:
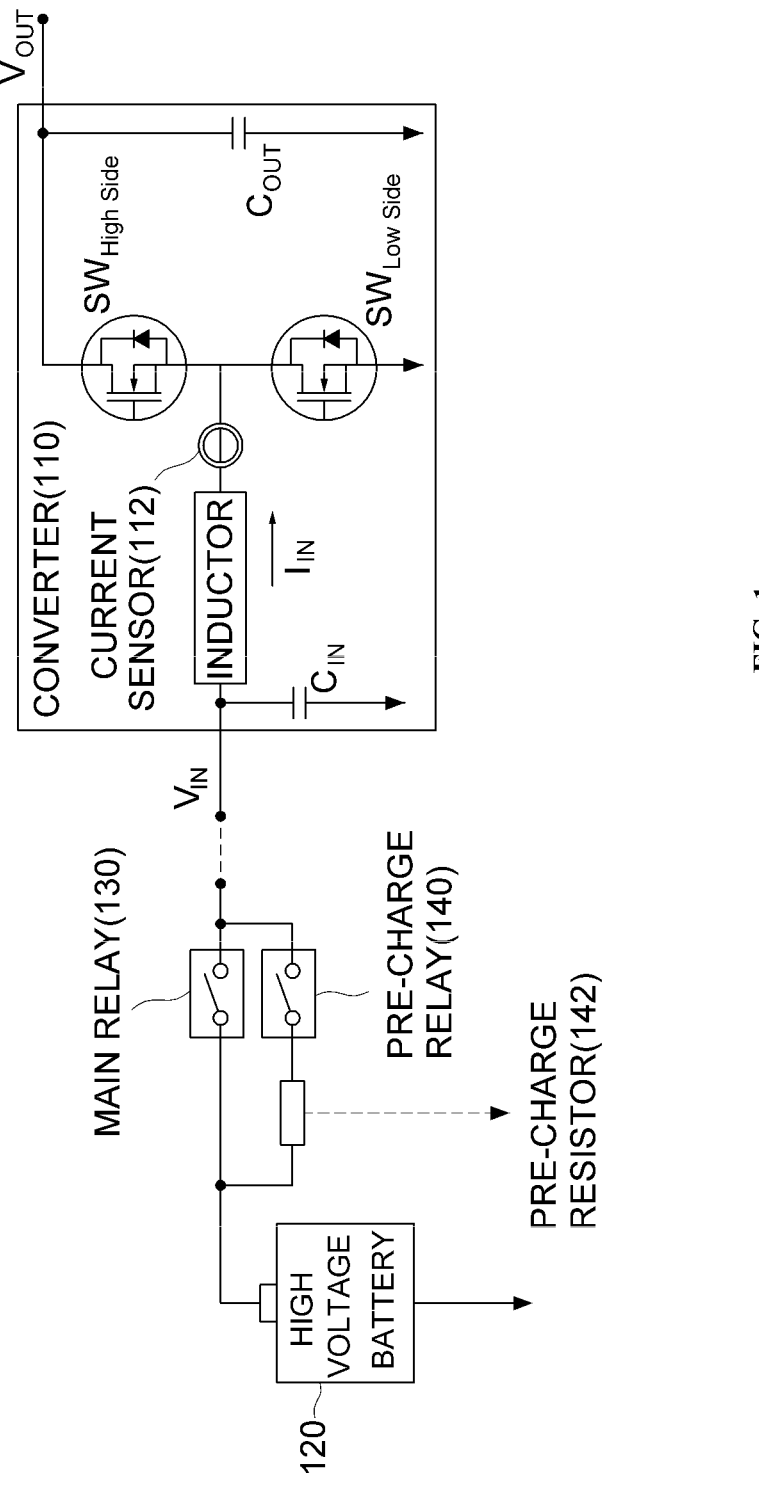
FIG. 1 is a schematic diagram illustrating a structure in which a converter is connected to a high voltage battery according to an embodiment of the present disclosure.

Hereinafter, specific details for implementation of the present disclosure will be described in detail with reference to the accompanying drawings. However, in the following description, when there is a risk of unnecessarily obscuring the gist of the present disclosure, a detailed description of a widely known function or configuration will be omitted.

In the accompanying drawings, identical or corresponding components are given the same reference numeral. In addition, in the description of following embodiments, duplicate descriptions of the same or corresponding components may be omitted. However, even if the description of a component is omitted, it is not intended that such component is not included in any embodiment.

Advantages and features of the disclosed embodiments, and methods of achieving them, will be apparent with reference to the embodiments described below along with the accompanying drawings. However, the present disclosure may be implemented in various other forms, not limited to the embodiments disclosed below. The embodiments are not intended to limit the scope of the invention but are provided to ensure completeness of the disclosure and to fully inform a person skilled in the art of the invention.

Before providing the embodiments in detail, terms used herein will be briefly described. The terms used herein have been selected from currently widely used general terms as much as possible while considering functions of the present disclosure, but these may vary depending on the intentions or precedents of those skilled in the art, the emergence of new technologies, and the like. In addition, in a specific case, there is a term arbitrarily selected by the applicant, and in this case, its meaning will be described in detail in the detailed description of the invention. Therefore, the terms used in the present disclosure should not be defined as simple wordings of the terms, but based on meanings of the terms and the overall contents of the present disclosure.

The singular forms are intended to include the plural forms, unless the context clearly specifies that they are singular. In addition, the plural forms include the singular forms, unless the context clearly specifies that they are plural. When it is described that a part includes a component throughout the entire specification, this means that other components may be further included without excluding other components unless stated to the contrary.

In the present disclosure, the terms "comprises", "comprising", and the like may indicate the presence of features, steps, operations, elements, and/or components, but do not preclude addition of one or more other functions, steps, operations, elements, components, and/or combinations thereof.

In the present disclosure, when it is mentioned that a particular component is "coupled", "combined", or "connected" or "reacts" to any other component, the particular component may be directly coupled, combined, and/or connected to, or react to the other component, but is not limited thereto, unless the context clearly indicates otherwise. For example, there may be one or more intermediate components between the particular component and the other component. In addition, in the present disclosure, "and/or" may include a combination of each or at least a part of one or more items listed.

In the present disclosure, terms such as "first", "second", etc. are used to distinguish a particular component from another component, and features of the component described using such terms are not limited by such terms. For example, a "first" component may be the same or similar type of component to a "second" component.

FIG. 1 is a schematic diagram illustrating a structure in which a converter 110 is connected to a high voltage battery 120 according to an embodiment of the present disclosure. In the illustrated example, a vehicle system used to drive an electric vehicle may include the converter 110, the high voltage battery 120, a main relay 130, and a pre-charge relay 140. Here, the converter 110 may be a DC/DC converter including one current sensor 112.

According to one embodiment, the pre-charge relay 140 may first be controlled to be turned ON to connect the converter 110 and the high voltage battery 120. Here, the pre-charge relay 140 is for preventing a spark generation problem when the converter 110 and the high voltage battery 120 are directly connected, and may be used to reduce a potential difference (i.e., voltage difference) between the converter 110 and the high voltage battery 120. To this end, the pre-charge relay 140 may be associated with a pre-charge resistor 142 having a specific resistance value. In other words, the pre-charge relay 140 may be controlled to be turned ON to reduce a potential difference between the converter 110 and the high voltage battery 120, and when the potential difference is sufficiently reduced, then the pre-charge relay 140 is controlled to be turned OFF, and the main relay 130 is controlled to be turned ON so that preparation for driving the vehicle may be completed.

According to one embodiment, the vehicle system may detect whether the current sensor 112 in the converter 110 fails when the pre-charge relay 140 is controlled to be turned ON. For example, the vehicle system may calculate a reference current value, compare the calculated reference current value with a sensing current value obtained from the current sensor 112, and detect whether the current sensor 112 fails. In other words, the vehicle system may determine that a failure occurs in the current sensor 112 when the sensing current value is not included in a range corresponding to the reference current value. The sensing current value refers to a current value received from the current sensor 112. According to an embodiment, the detection of a failure of the current sensor 112 may be performed using the pre-charge relay (140) without using the main relay (130) or before the main relay 130 connects the converter 110 and the high voltage battery 120.

According to one embodiment, the vehicle system may recognize a voltage value of the high voltage battery 120, and based on the recognized voltage value of the high voltage battery 120 and a resistance value of the pre-charge relay 140 (a resistance value of the pre-charge resistor 142), the reference current value of the converter 110 associated with the high voltage battery 120 may be calculated. For example, the vehicle system may calculate a reference current value I through Equation 1 below using $V_B$, which is the voltage value of the high voltage battery 120, and R, which is the resistance value of the pre-charge resistance 142.

$$I = \frac{V_B}{R} \qquad \text{[Equation 1]}$$

Here, the voltage value ($V_B$) of the high voltage battery 120 may be determined differently depending on whether it is discharged and how much it is charged. The calculated reference current value may be considered as a current value that the current sensor 112 is expected to provide if the current sensor 112 is not in a failure.

The vehicle system may then obtain the sensing current value from the current sensor 112. According to one embodiment, when the pre-charge relay 140 is connected, voltage may be filled on an input capacitor ($C_{IN}$) and an output capacitor ($C_{OUT}$) in the converter 110. As described above, when the voltage is filled on the input capacitor ($C_{IN}$) and the output capacitor ($C_{OUT}$), current may flow in the converter 110, and at this time the current sensor 112 may sense the current flowing in the converter 110. At this time, the vehicle system may obtain the sensing current value sensed by the current sensor 112.

The vehicle system may detect whether the current sensor 112 in the converter 110 fails using the calculated reference current value and the sensing current value obtained from the current sensor 112. For example, the vehicle system may determine a reference current value range having a tolerance range based on the reference current value, and detect whether the current sensor 112 in the converter fails based on whether the sensing current value falls within the reference current value range.

The vehicle system may perform an action based on the result of the determination whether the current sensor 112 fails or not. The vehicle system may use the result of the determination for various control and operation of the vehicle, such as control and operation for driving, maneuvering, speed change, stopping of the vehicle, or control and operation of other electronic components in the vehicle such as audio/sound components. If it is determined that the current sensor 112 is not in a failure, the vehicle system may utilize the current value sensed by the current sensor 112 for vehicle control. If it is determined that the current sensor 112 fails, the vehicle system may memorize an indication of such failure in a memory, transmit the same to another system, and/or provide an audio/visual alarm indicating such failure.

According to an embodiment, the vehicle system may perform comparison between the reference current value and the sensing current value multiple times to make a determination whether the current sensor 112 is in a failure. In preforming such comparison multiple times, the vehicle system may change and apply each time different resistance value by adjusting the pre-charge resistor 142 or by associating, with the pre-charge relay 140, a different pre-charge resistor 142 having a different resistance value. For example, for a first comparison, the vehicle system may apply a first resistance value, obtain a first reference current value based on the first resistance value, obtain a first sensing current value, and compare the first reference current value and the first sensing current value. For a second comparison, the vehicle system may apply a second resistance value different from the first resistance value, obtain a second reference current value based on the second resistance value, obtain a second sensing current value, and compare the second reference current value and the second sensing current value. The vehicle system may make a determination whether the current sensor 112 is in a failure or not based on the result of multiple times of comparison using multiple different resistance values of the pre-charge resistor 142.

Figure 2:
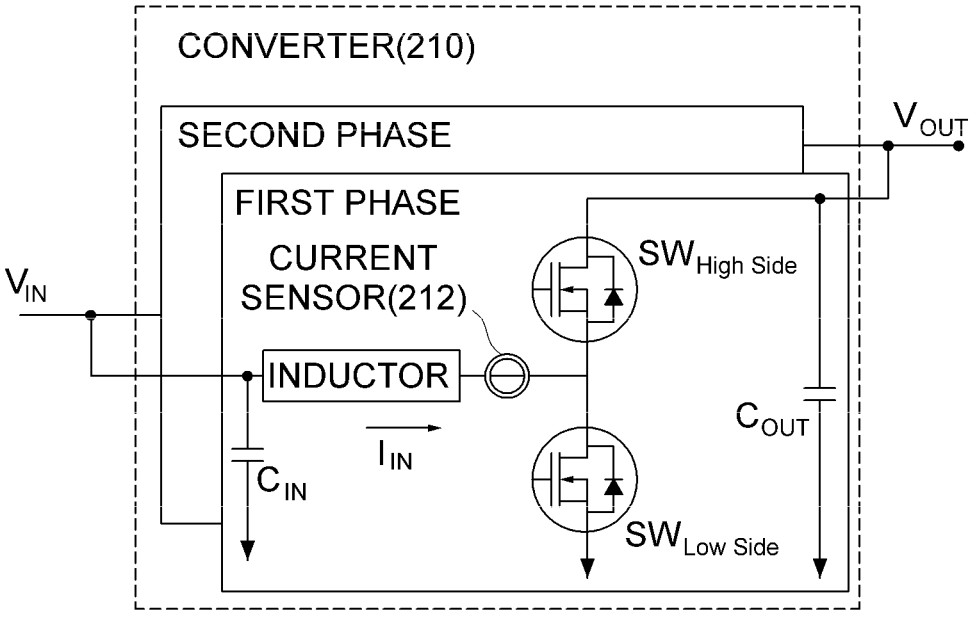
FIG. 2 is a schematic diagram illustrating an example of a converter having a plurality of phases according to an embodiment of the present disclosure.

This configuration allows the vehicle system to determine whether the current sensor 112 fails before the converter 110 is connected to the main relay 130 and operated. Additionally, since the converter 110 can include only one current sensor 112, in other words, since the converter 110 can determine whether the current sensor 112 fails or not even without any extra sensor, a PCB area may be reduced and price competitiveness may be effectively ensured compared to a conventional converter that includes two current sensors. FIG. 2 is a schematic diagram illustrating an example of a converter 210 having a plurality of phases according to an embodiment of the present disclosure. As described above, according to an embodiment of the present disclosure, a vehicle system may recognize a voltage value of a high voltage battery associated with a vehicle, calculate a reference current value of the converter 210 associated with the high voltage battery based on the recognized voltage value of the high voltage battery and the resistance value of the pre-charge relay, obtain a sensing current value from a current sensor 212 in the converter 210, and determine whether the current sensor 212 in the converter 210 fails based on the calculated reference current value and the sensing current value obtained from the current sensor.

According to an embodiment, when there is the converter 210 having a plurality of phases, the vehicle system may extract a phase value of the converter 210 and use the phase value to obtain a reference current value for each phase of the converter 210. For example, the vehicle system may divide the voltage value of the high voltage battery by the resistance value of the pre-charge relay to calculate a base current value, and divide the calculated base current value by the extracted phase value of the converter to calculate a reference current value for each phase of the converter 210. The phase value may mean the number of phases in the converter 210. In the illustrated example, when there is the converter 210 having a first phase and a second phase, the vehicle system may extract the phase value as 2, and calculate the reference current value corresponding to each phase of the converter 210 by dividing the base current value, which is obtained by dividing the voltage value of the high voltage battery by the resistance value of the pre-charge relay, by 2 which is the phase value again.

According to one embodiment, when the converter 210 has n phases, the reference current value may be calculated by Equation 2 below.

$$I = \frac{\frac{V_B}{R}}{n} \qquad \text{[Equation 2]}$$

Here, I may be the reference current value, R may be the resistance value of the pre-charge resistance, $V_B$ may be the voltage value of the high voltage battery, and n may be the phase value of the converter 210. By such configuration, when the converter 210 has a plurality of phases, only one current sensor for each phase may be used to detect a failure of the current sensor, in other words, the converter 210 can determine whether the current sensor 212 fails or not even without any extra sensor, thereby effectively reducing the PCB area and volume and ensuring high price competitiveness.

Figure 3:
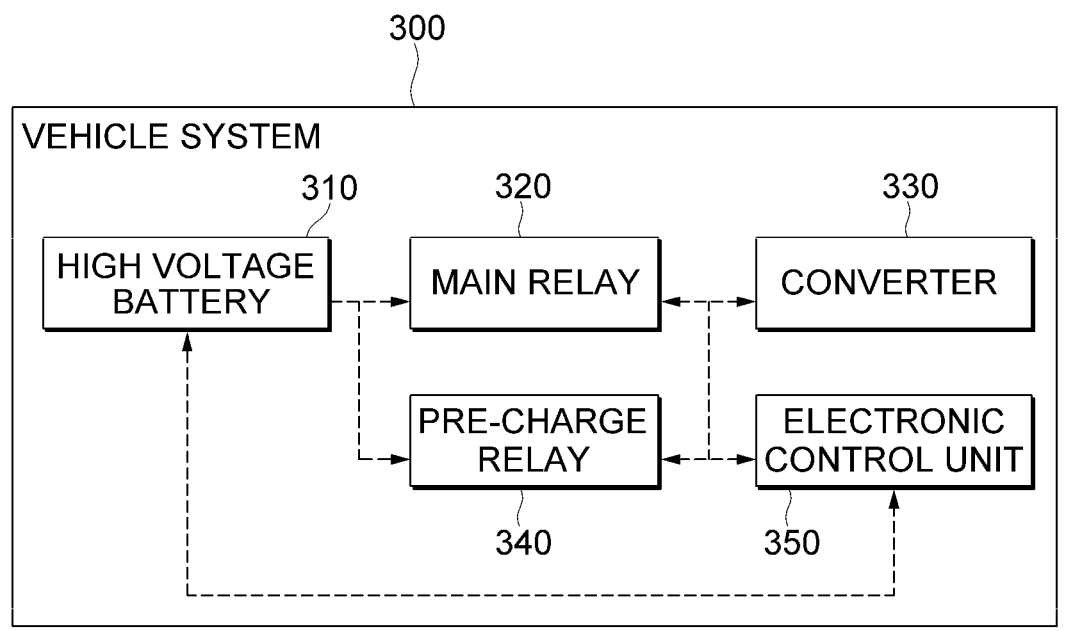
FIG. 3 is a block diagram illustrating an internal configuration of a vehicle system according to an embodiment of the present disclosure.

FIG. 3 is a block diagram illustrating an internal configuration of a vehicle system 300 according to an embodiment of the present disclosure. According to an embodiment, the vehicle system 300 may include a high voltage battery 310 for providing power to a vehicle, a converter 330 for converting a voltage of the high voltage battery 310 into a low voltage and providing it to an electric system associated with the vehicle, a pre-charge relay 340 for connecting the high voltage battery 310 and the converter 330 and reducing a potential difference between the high voltage battery 310 and the converter 330, a main relay 320 providing the voltage of the high voltage battery 310 to the converter 330 when the potential difference is reduced by the pre-charge relay 340, and an electronic control unit 350 for detecting whether a current sensor in the converter 330 fails.

According to one embodiment, the electronic control unit 350 may control the pre-charge relay 340 to be turned ON when vehicle starting is controlled to be ON. When the pre-charge relay 340 is controlled to be turned ON, voltage may be filled in the converter 330 to reduce the potential difference between the high voltage battery 310 and the converter 330. When the potential difference is reduced below a predetermined potential difference, the electronic control unit 350 may control the pre-charge relay 340 to be turned OFF and control the main relay 320 to be turned ON to connect the high voltage battery 310 and the converter 330. When the high voltage battery 310 and the converter 330 are connected as described above, preparations of the vehicle system 300 for driving the vehicle is completed.

According to one embodiment, the electronic control unit 350 may detect whether the current sensor in the converter 330 fails. When the vehicle starting is controlled to be ON, the electronic control unit 350 may recognize a voltage value of the high voltage battery 310 through communication. In addition, the electronic control unit 350 may calculate a reference current value of the converter 330 associated with the high voltage battery 310 based on the recognized voltage value of the high voltage battery 310 and a resistance value of the pre-charge relay 340. For example, the electronic control unit 350 may calculate the reference current value of the converter 330 based on dividing the voltage value of the high voltage battery 310 by the resistance value of the pre-charge relay 340. Then, the electronic control unit 350 may obtain a sensing current value from the current sensor in the converter 330. Then, the electronic control unit 350 may use the calculated reference current value and the sensing current value obtained from the current sensor to determine whether the current sensor in the converter 330 fails.

The electronic control unit 350 may perform an action based on the result of the determination whether the current sensor in the converter 330 fails or not. The electronic control unit may use the result of the determination for various control and operation of the vehicle, such as control and operation for driving, maneuvering, speed change, stopping of the vehicle, or control and operation of other electronic components in the vehicle such as audio/sound components. If it is determined that the current sensor in the converter 330 is not in a failure, the electronic control unit 350 may utilize a current value sensed by the current sensor in the converter 330 for vehicle control. If it is determined that the current sensor in the converter 330 fails, the electronic control unit 350 may memorize an indication of such failure in a memory, transmit the same to another system, and/or provide an audio/visual alarm indicating such failure.

According to an embodiment, electronic control unit 350 may perform comparison between the reference current value and the sensing current value multiple times to make a determination whether the current sensor in the converter 330 is in a failure. In preforming such comparison multiple times, the electronic control unit 350 may change and apply each time different resistance value of the pre-charge relay 340 by adjusting a pre-charge resistor associated with the pre-charge relay 340 or by associating, with the pre-charge relay 340, a different pre-charge resistor having a different resistance value. For example, for a first comparison, the electronic control unit may apply a first resistance value, obtain a first reference current value based on the first resistance value, obtain a first sensing current value, and compare the first reference current value and the first sensing current value. For a second comparison, the electronic control unit 350 may apply a second resistance value different from the first resistance value, obtain a second reference current value based on the second resistance value, obtain a second sensing current value, and compare the second reference current value and the second sensing current value. The vehicle system may make a determination whether the current sensor in the converter 330 is in a failure or not based on the result of multiple times of comparison using multiple different resistance values of the pre-charge relay 340.

This configuration allows the vehicle system 300 determine in advance whether the current sensor in the converter 330 fails when the pre-charge relay 340 is connected and/or before the main relay 320 connects the high voltage battery 310 and the converter 330, thereby effectively controlling the vehicle.

FIG. 4 is a diagram illustrating an example of a failure detection method 400 for detecting a failure of a current sensor in a converter according to an embodiment of the present disclosure. The failure detection method 400 for detecting a failure of the current sensor may be performed by at least one processor (e.g., at least one processor of a vehicle system). The failure detection method 400 for detecting a failure of the current sensor may begin with a step in which the processor recognizes a voltage value of a high voltage battery associated with a vehicle (S410).

The processor may calculate a reference current value of the converter associated with the high voltage battery based on the recognized voltage value of the high voltage battery and a resistance value of a pre-charge relay (S420). For example, the processor may calculate the reference current value of the converter by dividing the recognized voltage value of the high voltage battery by the resistance value of the pre-charge relay. Additionally or alternatively, when the converter has multiple phases, the processor may extract a phase value of the converter, divide the voltage value of the high voltage battery by the resistance value of the pre-charge relay to calculate a base current value, and then divide the calculated base current value by the extracted phase value of the converter to calculate the reference current value of the converter. The phase value may mean the number of phases in the converter. When the converter has multiple phases, the calculated reference current value may be a reference current value for each of the phases in the converter. The calculated reference current value may be considered as a current value that the current sensor is expected to provide if the current sensor is not in a failure.

The processor may obtain a sensing current value from the current sensor in the converter (S430). In addition, the processor may detect or determine whether the current sensor in the converter fails by using the calculated reference current value and the sensing current value obtained from the current sensor (S440). According to an embodiment, the processor may determine a reference current value range having a tolerance range based on the calculated reference current value of the converter, and detect or determine whether the sensing current value falls within the reference current value range to make a determination whether the current sensor in the converter fails or not. Here, the tolerance range may be a predetermined value T, and the reference current value range may be a range having an upper limit of a +T value and a lower limit of a −T value based on the reference current value when the calculated reference current value is a. According to an embodiment, at least one of steps S410, S420, S430 and S440 may be performed before the main relay connects the high voltage battery and the converter.

According to an embodiment, the processor may perform S410, S420, S430 and S440 multiple times to make a determination whether the current sensor is in a failure. In preforming such comparison multiple times, the processor may change and apply each time different resistance value of the pre-charge relay by adjusting a pre-charge resistor associated with the pre-charge relay or by associating, with the pre-charge relay, a different pre-charge resistor having a different resistance value. For example, for a first comparison, the processor may apply a first resistance value, obtain a first reference current value based on the first resistance value, obtain a first sensing current value, and compare the first reference current value and the first sensing current value. For a second comparison, the processor may apply a second resistance value different from the first resistance value, obtain a second reference current value based on the second resistance value, obtain a second sensing current value, and compare the second reference current value and the second sensing current value. The processor may make a determination whether the current sensor is in a failure or not based on the result of multiple times of comparison using multiple different resistance values of the pre-charge relay.

Figure 5:
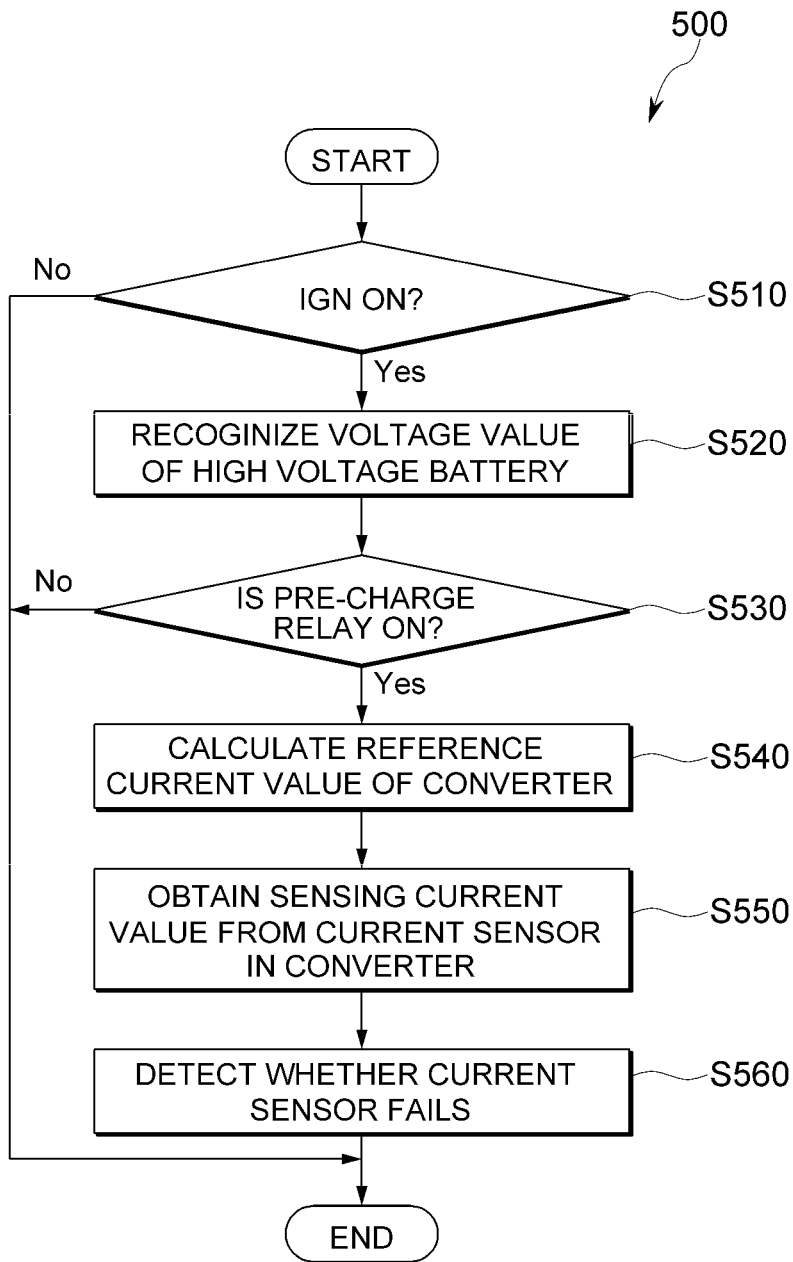
FIG. 5 is a diagram illustrating an example of a failure detection method of a current sensor in a converter based on driving of a vehicle system according to an embodiment of the present disclosure.

FIG. 5 is a diagram illustrating an example of a failure detection method 500 for detecting a failure of a current sensor in a converter based on driving a vehicle system according to an embodiment of the present disclosure. The failure detection method 500 for detecting a failure of the current sensor may be performed by at least one processor (e.g., at least one processor of the vehicle system). The failure detection method 500 of the current sensor may start with a step in which the processor determines whether or not IGN (ignition) indicating vehicle starting is controlled to be ON (S510).

When IGN is controlled to be ON, the processor may recognize a voltage value of a high voltage battery associated with a vehicle (S520). The processor may then determine whether a pre-charge relay is controlled to be turned ON (S530). When the pre-charge relay is controlled to be turned ON, the processor may calculate a reference current value of the converter based on the voltage value of the high voltage battery and a resistance value of the pre-charge relay (S540).

The processor may obtain a sensing current value from the current sensor in the converter (S550). Then, the processor may detect whether the current sensor in the converter fails using the calculated reference current value and the sensing current value obtained from the current sensor (S560). In making a determination whether the current sensor in the converter is in a failure or not, the processor may repeat step S510 through S560 or at least steps S540, S550, and S560 multiple times as described above.

Figure 6:
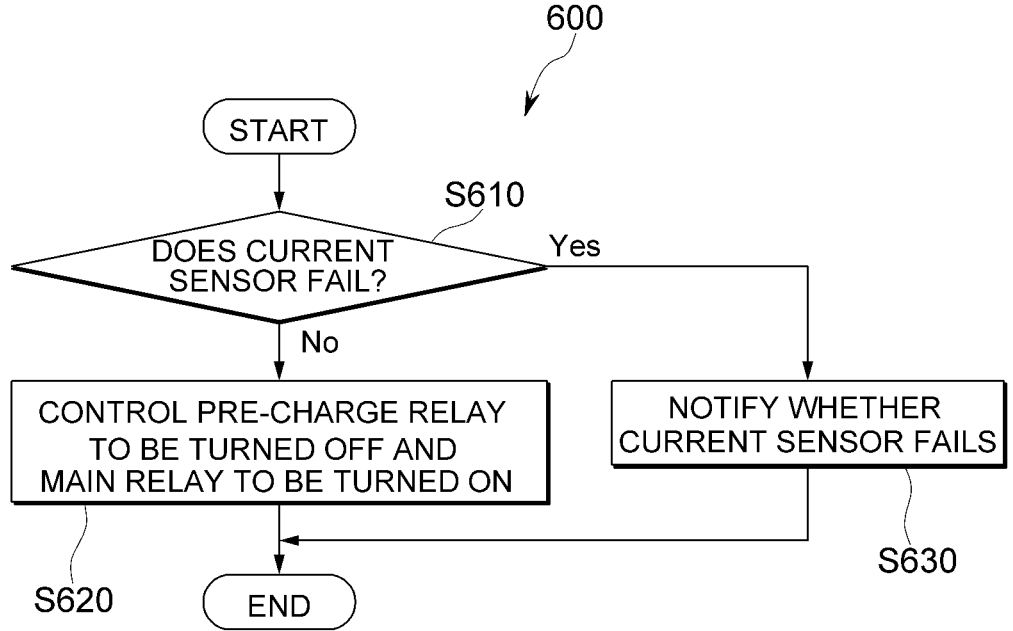
FIG. 6 is a diagram illustrating an example of a driving control method of a vehicle system based on a determination whether a current sensor fails according to an embodiment of the present disclosure.

FIG. 6 is a diagram illustrating an example of a driving control method 600 of a vehicle system based on a decision whether a current sensor fails according to an embodiment of the present disclosure. The driving control method 600 of the vehicle system may be performed by at least one processor (e.g., at least one processor of the vehicle system). The driving control method 600 of the vehicle system may start with a step in which the processor detects whether the current sensor in the converter fails (S610).

According to an embodiment, when it is determined that no failure occurs in the current sensor, the processor may connect a high voltage battery and the converter by controlling a pre-charge relay to be turned OFF and controlling a main relay to be turned ON (S620). When the high voltage battery and the converter are connected as described above, the processor may control driving of the vehicle using a voltage of the high voltage battery.

When it is determined that a failure occurs in the current sensor, the processor may notify that the current sensor fails (S630). For example, the processor may communicate with a driver's user terminal and notify that the current sensor fails. In another example, the processor may notify that the current sensor fails through a display unit of the vehicle.

Figure 7:
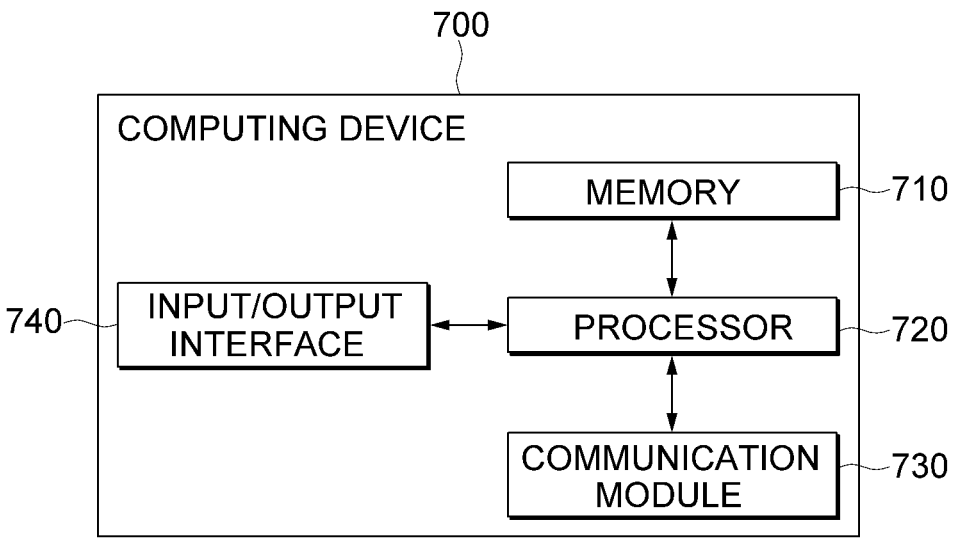
FIG. 7 is a block diagram illustrating an internal configuration of a computing device according to an embodiment of the present disclosure.

FIG. 7 is a block diagram illustrating an internal configuration of a computing device 700 according to an embodiment of the present disclosure. According to one embodiment, the computing device 700 may represent the vehicle system and/or electronic control unit described above. The computing device 700 may include a memory 710, a processor 720, a communication module 730, and an input/output interface 740, and as shown in FIG. 7, the computing device 700 may be configured to communicate information and/or data over a network using the communication module 730.

The memory 710 may include any non-transitory computer-readable recording medium. According to one embodiment, the memory 710 may include a permanent mass storage device such as a random access memory (RAM), read only memory (ROM), disk drive, solid state drive (SSD), flash memory, and the like. As another example, a permanent mass storage device such as ROM, SSD, flash memory, disk drive, and the like may be included in the computing device 700 as a separate permanent storage device distinct from the memory. In addition, the memory 710 may store an operating system and at least one program code.

Such software components may be loaded from a computer-readable recording medium separate from the memory 710. Such a separate computer-readable recording medium may include a recording medium directly connected to the computing device 700, for example, a computer-readable recording medium such as a floppy drive, disk, tape, DVD/CD-ROM drive, memory card, or the like. As another example, software components may be loaded into the memory 710 via the communication module 730 rather than the computer-readable recording medium. For example, at least one program may be loaded into the memory 710 based on a computer program installed by files provided by developers or a file distribution system that distributes installation files of an application through the communication module 730.

The processor 720 may be configured to process instructions of a computer program by performing basic arithmetic, logic, and input/output operations. The instructions may be provided to another user terminal (not shown) or another external system by the memory 710 or the communication module 730.

The communication module 730 may provide a configuration or function for communication between a user terminal (not shown) and the computing device 700 through the network, and the computing device 700 may provide a configuration or function for communicating with an external system (for example, a separate cloud system, etc.). For example, control signals, instructions, data, etc. provided under control of the processor 720 of the computing device 700 may be transmitted to the user terminal and/or the external system through a communication module of the user terminal and/or the external system via the communication module 730 and the network.

In addition, the input/output interface 740 of the computing device 700 may be a means for interfacing with the computing device 700 or with a device for input or output that the computing device 700 may include (not shown). In FIG. 7, the input/output interface 740 is shown as an element configured separately from the processor 720, but is not limited thereto, and the input/output interface 740 may be configured to be included in the processor 720. The computing device 700 may include more components than the components of FIG. 7. However, there is no need to clearly illustrate most conventional components.

The processor 720 of the computing device 700 may be configured to manage, process, and/or store information and/or data received from a plurality of user terminals and/or a plurality of external systems.

The methods described above and/or various embodiments may be realized with digital electronic circuits, computer hardware, firmware, software, and/or combinations thereof. Various embodiments of the present disclosure may be implemented as computer programs executed by a data processing device, e.g., one or more programmable processors and/or one or more computing devices, or stored in a computer-readable recording medium and/or a computer-readable recording medium. The computer program as described above may be written in any form of programming language, including compiled languages or interpreted languages, and may be distributed in any form such as stand-alone programs, modules, subroutines, and the like. A computer program may be distributed through one computing device, a plurality of computing devices connected over the same network, and/or a plurality of computing devices distributed to be connected over a plurality of different networks.

The methods described above and/or various embodiments may be performed by one or more processors configured to execute one or more computer programs that process, store, and/or manage any function, function, etc., by operating based on input data or generating output data. For example, the methods and/or various embodiments of the present disclosure may be performed by a special purpose logic circuit such as a Field Programmable Gate Array (FPGA) or an Application Specific Integrated Circuit (ASIC), and the apparatus and/or system for performing the methods and/or embodiments of the present disclosure may be implemented as a special purpose logic circuit such as an FPGA or ASIC.

One or more processors executing computer programs may include general purpose or special purpose microprocessors and/or one or more processors of any kind of digital computing device. The processor may receive instructions and/or data from each of read-only memory and random access memory, or may receive instructions and/or data from read-only memory and random access memory. In the present disclosure, components of a computing device performing methods and/or embodiments may include one or more processors for executing instructions, and one or more memory devices for storing instructions and/or data.

According to one embodiment, the computing device may exchange data with one or more mass storage devices for storing data. For example, the computing device may receive data from a magnetic disk or optical disc and/or transmit data to a magnetic disk or optical disk. A computer-readable recording medium suitable for storing instructions and/or data associated with a computer program may include, but is not limited to, any form of nonvolatile memory, including semiconductor memory devices such as Erasable Programmable Read-Only Memory (EPROM), Electrically Erasable PROM (EEPROM), flash memory devices, and the like. For example, a computer-readable recording medium may include a magnetic disk such as an internal hard disk or a removable disk, an optical optical disk, a CD-ROM, and a DVD-ROM disk.

In order to provide interaction with a user, the computing device may include a display device for providing or displaying information to the user (e.g., a Cathode Ray Tube (CRT), a Liquid Crystal Display (LCD), etc., and a pointing device (e.g., keyboard, mouse, trackball, etc.) that allows the user to provide input and/or commands on the computing device, but is not limited thereto. In other words, the computing device may further include any other kind of devices for providing interaction with the user. For example, the computing device may provide any form of sensory feedback to the user, including visual feedback, auditory feedback, and/or tactile feedback, for interaction with the user. In response, the user may provide input to the computing device through various gestures such as sight, voice, and motion.

In the present disclosure, various embodiments may be implemented in a computing system including a backend component (e.g., a data server), a middleware component (e.g., an application server), and/or a front-end component. In this case, the components may be interconnected by any form or medium of digital data communication, such as a communication network. For example, the communication network may include a local area network (LAN), a wide area network (WAN), and the like.

A computing device based on the exemplary embodiments described herein may be implemented using hardware and/or software configured to interact with the user, including a user device, a user interface (UI) device, a user terminal or a client device. For example, the computing device may include a portable computing device such as a laptop computer. Additionally or alternatively, the computing device may include, but is not limited to, personal digital assistants (PDAs), tablet PCs, game consoles, wearable devices, internet of things (IoT) devices, virtual reality (VR) devices, augmented reality (AR) devices, and the like. The computing device may further include other types of devices configured to interact with the user. In addition, the computing device may include portable communication devices (eg, mobile telephones, smart phones, wireless cellular phones, etc.) suitable for wireless communication over a network such as a mobile communication network. A computing device may use a radio frequency (RF; Radio Frequency), microwave frequency (MWF; Microwave Frequency), and/or infrared ray frequency (IRF; Infrared Ray Frequency) may be configured to communicate wirelessly with a network server using wireless communication techniques and/or protocols.

In the present disclosure, various embodiments including certain structural and functional details are exemplary. Accordingly, embodiments of the present disclosure are not limited to those described above, and may be implemented in various other forms. In addition, the terms used in the present disclosure are intended to describe some embodiments and are not construed as limiting the embodiments. For example, singular words and the above terms may be construed to include plural forms unless otherwise clearly indicated in context.

In the present disclosure, unless otherwise defined, all terms used herein, including technical or scientific terms, have the same meaning as commonly understood by those skilled in the art to which these concepts pertain. In addition, terms defined in dictionaries generally used should be construed to have meanings matching contextual meanings in the related art.

Although the present disclosure has been described in connection with some embodiments herein, various modifications and changes may be made within the scope of the present disclosure that can be understood by those skilled in the art to which the present disclosure pertains. In addition, such modifications and changes should be considered to fall within the scope of the claims appended herein.

Also, it is noted that any one feature of an embodiment of the present disclosure described in the specification may be applied to another embodiment of the present disclosure.

What is claimed is:

1. A failure detection method for detecting a failure of a current sensor in a converter performed by a vehicle system comprising a high voltage battery, a converter, a pre-charge relay and an electronic control unit, the failure detection method comprising:

recognizing, by the electronic control unit, a voltage value of the high voltage battery for providing power to a vehicle;

recognizing, by the electronic control unit, a resistance value of the pre-charge relay for connecting the high voltage battery and the converter and reducing a potential difference between the high voltage battery and the converter;

calculating, by the electronic control unit, a reference current value of the converter associated with the high voltage battery based on the recognized voltage value of the high voltage battery and the resistance value of the pre-charge relay;

obtaining, by the electronic control unit, a sensing current value from the current sensor in the converter; and detecting, by the electronic control unit, whether the current sensor in the converter fails using the calculated reference current value and a sensing current value obtained from the current sensor.

2. The failure detection method of claim 1, wherein the calculating of the reference current value of the converter comprises calculating the reference current value of the converter based on dividing the recognized voltage value of the high voltage battery by the resistance value of the pre-charge relay.

3. The failure detection method of claim 2, further comprising:

extracting, by the electronic control unit, a phase value of the converter, wherein the calculating of the reference current value of the converter based on dividing the recognized voltage value of the high voltage battery by the resistance value of the pre-charge relay comprises:

calculating a base current value by dividing the voltage value of the high voltage battery by the resistance value of the pre-charge relay; and calculating the reference current value of the converter by dividing the calculated base current value by the extracted phase value of the converter.

4. The failure detection method of claim 1, wherein the calculating the reference current value of the converter based on the voltage value of the high voltage battery and the resistance value of the pre-charge relay is performed when the pre-charge relay is controlled to be turned ON.

5. The failure detection method of claim 1, wherein the recognizing the voltage value of the high voltage battery associated with the vehicle is performed in response to starting of the vehicle being controlled to be ON.

6. The failure detection method of claim 1, wherein the detecting of whether the current sensor in the converter fails comprises:

determining a reference current value range having a tolerance range based on the calculated reference current value of the converter; and detecting whether the current sensor in the converter fails based on whether the sensing current value falls within the reference current value range.

7. The failure detection method of claim 1, wherein the converter is a DC/DC converter comprising one current sensor.

8. A vehicle system comprising:

a high voltage battery for providing power to a vehicle;

a converter for converting a voltage of the high voltage battery into a low voltage to provide it to an electric system associated with the vehicle;

a pre-charge relay for connecting the high voltage battery and the converter and reducing a potential difference between the high voltage battery and the converter;

a main relay configured to connect the high voltage battery and the converter and provide the voltage of the high voltage battery to the converter when the potential difference is reduced by the pre-charge relay; and an electronic control unit configured to detect a failure of a current sensor in the converter using the pre-charge relay.

9. The vehicle system of claim 8, wherein the electronic control unit is configured to:

recognize a voltage value of the high voltage battery associated with the vehicle;

calculate a reference current value of the converter associated with the high voltage battery based on the recognized voltage value of the high voltage battery and a resistance value of the pre-charge relay; and detect whether the current sensor in the converter fails using the calculated reference current value.

10. The vehicle system of claim 9, wherein the electronic control unit is configured to calculate the reference current value of the converter based on dividing the recognized voltage value of the high voltage battery by the resistance value of the pre-charge relay.

11. The vehicle system of claim 10, wherein the electronic control unit is configured to:

extract a phase value of the converter;

calculate a base current value by dividing the voltage value of the high voltage battery by the resistance value of the pre-charge relay; and calculate the reference current value of the converter by dividing the calculated base current value by the extracted phase value of the converter.

12. The vehicle system of claim 9, wherein the electronic control unit is configured to:

in response to starting of the vehicle being controlled to be ON, control the pre-charge relay to be turned ON; and when the pre-charge relay is controlled to be turned ON, calculate the reference current value of the converter based on the voltage value of the high voltage battery and the resistance value of the pre-charge relay.

13. The vehicle system of claim 12, wherein the electronic control unit is configured to control the pre-charge relay to be turned OFF and control the main relay to be turned ON to connect the converter with the high voltage battery when no failure is detected in the current sensor in the converter.

14. The vehicle system of claim 9, wherein the electronic control unit is configured to:

obtain a sensing current value from the current sensor in the converter; and detect whether the current sensor in the converter fails using the calculated reference current value and the sensing current value obtained from the current sensor.

15. The vehicle system of claim 9, wherein the electronic control unit is configured to recognize the voltage value of the high voltage battery associated with the vehicle in response to starting of the vehicle being controlled to be ON.

16. The vehicle system of claim 9, wherein the electronic control unit is configured to:

obtain a sensing current value from the current sensor in the converter;

determine a reference current value range having a tolerance range based on the calculated reference current value of the converter; and detect whether the current sensor in the converter fails based on whether the sensing current value falls within the reference current value range.

17. The vehicle system of claim 8, wherein the converter is a DC/DC converter comprising one current sensor.

18. An electronic control unit in a vehicle system comprising a high voltage battery, a converter, and a pre-charge relay, the electronic control unit comprising a processor and a memory, the electronic control unit, by an operation of the processor, configured to:

recognize a voltage value of the high voltage battery associated with a vehicle for providing power to the vehicle;

recognize a resistance value of the pre-charge relay for connecting the high voltage battery and the converter and reducing a potential difference between the high voltage battery and the converter;

based on the recognized voltage value of the high voltage battery and the resistance value of the pre-charge relay, calculate a reference current value of a converter associated with the high voltage battery;

obtain a sensing current value from a current sensor in the converter; and detect whether the current sensor in the converter fails using the calculated reference current value and the sensing current value obtained from the current sensor.

19. The electronic control unit of claim 18, wherein the electronic control unit is configured to calculate the reference current value of the converter based on dividing the recognized voltage value of the high voltage battery by the resistance value of the pre-charge relay.

20. The electronic control unit of claim 18, wherein the electronic control unit is configured to:

determine a reference current value range having a tolerance range based on the calculated reference current value of the converter; and detect whether the current sensor in the converter fails based on whether the sensing current value falls within the reference current value range.

\* \* \* \* \*